(12) United States Patent
Flammer et al.

(10) Patent No.: US 7,044,003 B2
(45) Date of Patent: May 16, 2006

(54) TORQUE MEASURING DEVICE FOR ELECTRIC MOTORS

(75) Inventors: Hermann Flammer, Zimmern-Floezlingen (DE); Hubert Hauser, Balgheim (DE); Norbert Irmer, Villingen-Schwenningen (DE); Guido Schmid, Triberg (DE)

(73) Assignee: Minebea Co., Ltd., Miyota-machi (JP)

( * ) Notice: Subject to any disclaimer, the term of this patent is extended or adjusted under 35 U.S.C. 154(b) by 0 days.

(21) Appl. No.: 10/891,679

(22) Filed: Jul. 14, 2004

(65) Prior Publication Data

US 2005/0011288 A1  Jan. 20, 2005

(30) Foreign Application Priority Data

Jul. 16, 2003  (DE) ................. 103 33 397

(51) Int. Cl.
*B25B 23/14* (2006.01)
*G01L 5/24* (2006.01)

(52) U.S. Cl. ................................... 73/862.26

(58) Field of Classification Search ............... 73/865.9, 73/862.26, 862.193; 318/434, 331; 322/89
See application file for complete search history.

(56) References Cited

U.S. PATENT DOCUMENTS

| 3,019,640 | A | * | 2/1962 | Engelmann | 73/862.193 |
| 3,891,908 | A | * | 6/1975 | Porras | 318/434 |
| 4,645,991 | A | * | 2/1987 | Ban et al. | 318/331 |
| 4,846,006 | A | * | 7/1989 | Thibeault | 73/865.9 |
| 6,154,013 | A | * | 11/2000 | Caamano | 322/89 |

FOREIGN PATENT DOCUMENTS

| DE | 39 41 495 | 6/1990 |
| DE | 40 14 165 | 11/1991 |
| DE | 42 16 234 | 11/1993 |
| DE | 697 06 746 | 10/1997 |

\* cited by examiner

*Primary Examiner*—Max Noori
*Assistant Examiner*—Octavia Davis
(74) *Attorney, Agent, or Firm*—Lipsitz & McAllister LLC

(57) ABSTRACT

A torque measuring device for electric motors comprising a stator and a rotor is disclosed in which a holding apparatus to hold the stator of a test electric motor is provided, a drive apparatus for the rotor is provided and a torque sensor that is coupled to the drive apparatus is provided.

17 Claims, 1 Drawing Sheet

TORQUE MEASURING DEVICE FOR ELECTRIC MOTORS

The present disclosure relates to the subject matter disclosed in German application No. 103 33 397.5 of Jul. 16, 2003, which is incorporated herein by reference in its entirety and for all purposes.

BACKGROUND OF THE INVENTION

The invention relates to a torque measuring device for electric motors having a stator and a rotor.

Torque as a function of rotational speed is an important parameter of an electric motor.

SUMMARY OF THE INVENTION

In accordance with the invention, a measuring device which allows torque to be measured as a function of rotational speed in a simple and precise manner is provided.

In accordance with the invention, a holding apparatus is provided to hold the stator of a test electric motor, a drive apparatus for the rotor is provided and a torque sensor that is coupled to the drive apparatus is provided.

In this torque measuring device, the stator can be held stationary and the rotor can be forced into rotation through the motor in operation or, for a motor which is currentless, by means of the drive apparatus, or the rotor can be driven externally. The torque that is needed to drive the rotor can in turn be measured by means of the torque sensor. In this way, the torque as a function of the initial rotational speed can be obtained. In particular, the starting torque and the cogging torque of the test electric motor can be measured by these means.

It is particularly provided that using the drive apparatus, a movement in the same direction as a rotational direction of the rotor with the motor in operation can be exerted, i.e. by means of the drive apparatus, the rotor is driven in the rotational direction or a corresponding rotational movement is imposed on it.

It is particularly favorable if rotational speeds of between one revolution per minute and 20,000 revolutions per minute are achieved using the drive apparatus. This enables the torque for electric motors to be measured over an extensive speed range.

It is particularly favorable if the drive apparatus comprises an ironless drive motor. Ironless drive motors have a very low mechanical time constant so that very high precision can be achieved in measuring torque. Moreover, they have no magnetic cogging torque so that the measurement is not influenced by this.

An ironless drive motor, for example, allows rotational speeds of 500 revolutions per minute and more to be achieved. It is then particularly advantageous if the drive apparatus includes a belt drive, allowing rotational speeds of under 500 revolutions per minute to be achieved, thus in turn enabling a wide speed range to be covered.

It is favorable if a rotational movement of the rotor can be driven using alternatively the belt drive or the ironless drive motor so that rotational speeds can be set over an extensive range of speeds.

In particular, when the ironless drive motor is used as the drive, the belt drive is uncoupled in order to prevent mechanical damage to the belt drive.

A simple construction for the device can be achieved if a shaft of the ironless drive is driven by the belt drive when the belt drive is being used as the drive. This means that the drive motor need not be swiveled aside. Since the drive motor is iron free, its shaft can be driven externally.

In particular, the torque sensor is coupled to the ironless drive motor and/or formed by means of the ironless drive motor. In the first case, the torque sensor is coupled to a shaft of the ironless drive motor. This enables a simple construction of the device to be realized since this coupling need not be changed for measurements over the entire speed range.

In particular, the torque sensor is positioned between the ironless drive motor and the rotor of the test electric motor so that the torque can be thus measured.

Measurement of the rotational speed can take place at the drive apparatus in order to determine the rotational speed with which the drive apparatus is driven and in particular to determine the rotational speed at which a shaft of the ironless drive motor rotates.

It is also favorable if measurement of rotational speed and/or angular position also takes place at the rotor. This allows the rotational speed and/or the angular position of the rotor to be precisely defined.

Great precision in measuring the torque can be achieved if at least one compensating coupling is provided between the drive apparatus and a fixing apparatus for the rotor. Axis offsets in the measuring device could result in the torque measurement being influenced. Compensating couplings can compensate such axis offsets to again achieve high precision in measuring the torque.

Provision can be made for the ironless drive motor to be air journalled in order to thus minimize vibrations in the system.

In particular, torque can be measured as a function of the rotational speed of the rotor using the device according to the invention. Motor friction can also be measured as a function of the rotational speed.

It is favorable if a holding plate for the stator is air journalled. This allows the stator to be supported with low vibration so that any related influence on the measurement result is minimized.

Provision can be made for torque to be measured by means of a motor current of the ironless drive motor. The ironless drive motor in its entirety then acts as a torque sensor. Since an ironless drive motor does not have any magnetic cogging torque, the (intrinsic) torque of the test electric motor can be ascertained. With known constants for the ironless drive motor, the torque can be determined from the motor current of the ironless drive motor.

It is particularly favorable if the drive apparatus is more powerful and particularly significantly more powerful than the test electric motor. This enables a rotational movement to be imposed by the drive apparatus on the test electric motor during its operation, the rotational movement being determined by the drive apparatus. This makes it possible, particularly at low rotational speeds, to measure the torque precisely and particularly to measure the starting torque with fine precision.

The following description of a preferred embodiment in conjunction with the drawing serves to explain the invention in more detail.

BRIEF DESCRIPTION OF THE DRAWINGS

As the only drawing.

DETAILED DESCRIPTION OF THE INVENTION

Figure 1:
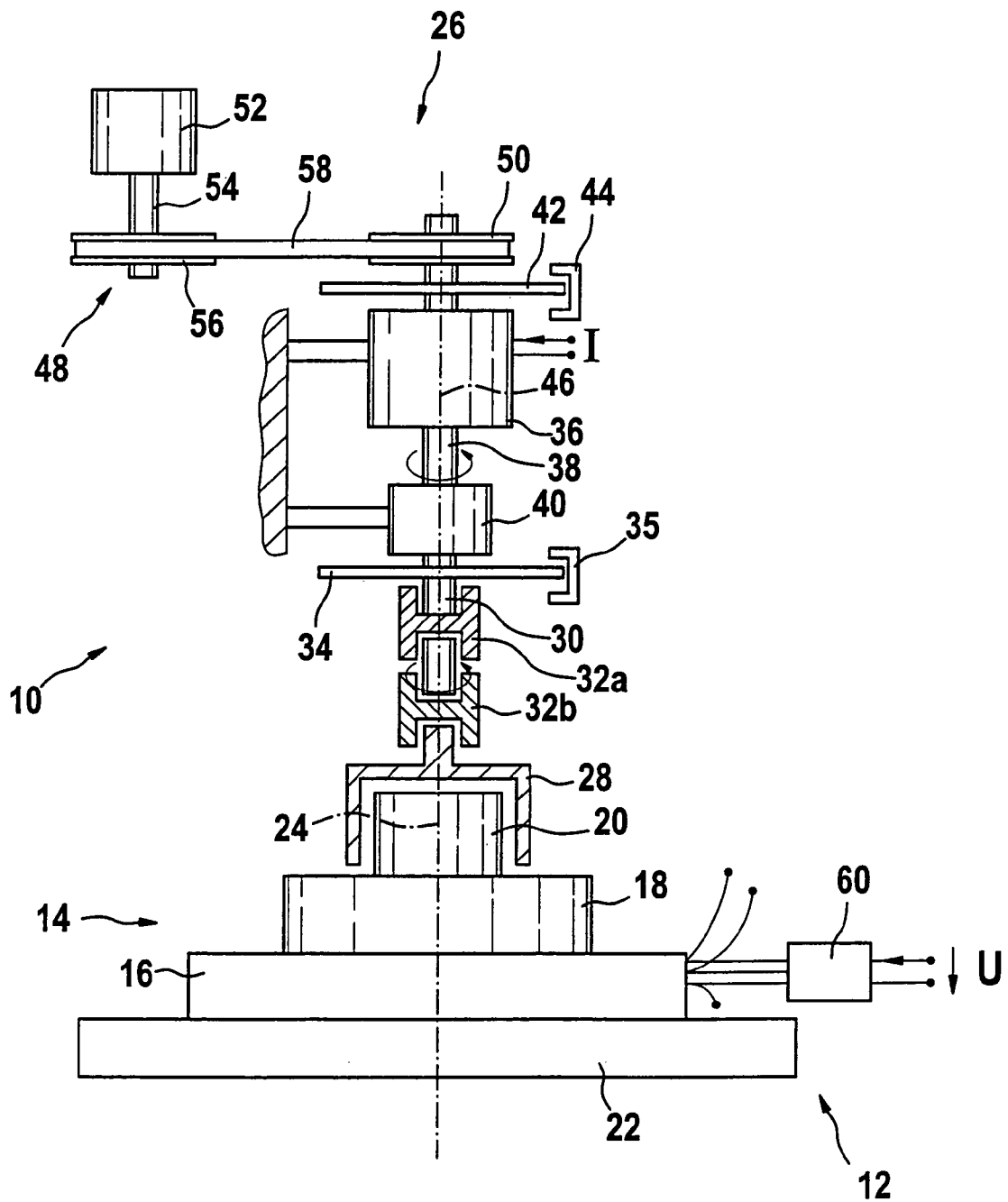
FIG. 1 shows a schematic view of an embodiment of the torque measuring device according to the invention.

An embodiment of a torque measuring device according to the invention as shown in FIG. 1 and indicated there in its entirety by 10, comprises a holding apparatus 12 for a test electric motor 14. The electric motor comprises a stator 16 and a rotor 18 that can rotate with respect to the stator 16. An embodiment of such an electric motor is illustrated in FIG. 1, the rotor 18 having a rotor hub 20.

The holding apparatus 12 includes, for example, a holding plate 22 in respect of which the stator 16 is firmly fixed, for example, using brackets (not illustrated in the drawing). The stator 16 is fixed with respect to the holding plate 22 in such a way that the rotation of the rotor 18 is not hindered.

Provision can be made for the holding plate 22 itself to be air journalled in order to support the test electric motor 14 in the torque measuring device 10 without vibration.

When the motor is in operation, the rotor 18 rotates about a rotational axis 24. In accordance with the invention, a drive apparatus is provided, indicated in its entirety by 26, which can be coupled to the rotor 18. The drive apparatus 26 is significantly more powerful than the test electric motor 14. This allows a rotational movement, having a rotational speed established by the drive apparatus 26, to be "imposed" when the motor is in operation, or the rotor 18 can be driven externally in the case of a motor 14 which is currentless.

The drive apparatus 26 includes a fixing apparatus 28 to which the rotor 18 can be firmly fixed. The fixing apparatus 28, for example, can take the form of a chuck into which the rotor hub 20 can be inserted and then held tight. In particular, the aperture width of such a chuck is adjustable so that rotor hubs 20 having different diameters can be inserted and clamped.

The fixing apparatus 28 is connected fixedly to a shaft 30 which in turn is driven by the drive apparatus 26. Provision can be made for the shaft 30 to be made up of several parts and for one or more compensating couplings 32a, 32b to be available. These compensating couplings 32a, 32b make it possible to compensate any axis offset of the shaft 30 to the rotational axis 24 of the rotor 18. The shaft 30 preferably lies coaxial to the rotational axis 24. However, when the shaft 30 is fixed to the rotor 18, an offset can occur. An offset of this kind can also be produced by the arrangement of the drive apparatus 26. Such an offset can be compensated by the compensating couplings 32a, 32b.

Provision is made for the rotational speed of the rotor 18 to be measured. Where applicable, provision is also made for the angular position to be measured. For this purpose, a code disk 34 that carries relevant code symbols, for example, is coupled to the shaft 30. By reading these code symbols using an encoder 35, the rotational speed and, where applicable, the angular position of the rotor 18 can be determined via the shaft 30.

The drive apparatus 26 includes an ironless drive motor 36. An ironless drive motor having an ironless rotor has a small mechanical time constant. In particular, a motor with an ironless rotor does not have any magnetic cogging torque.

A shaft 38 of this ironless drive motor 36 is coupled to a torque sensor 40, this torque sensor 40 in turn being coupled to the shaft 30. The torque sensor 40 can be arranged to swivel aside, for example, so that it can be de-coupled when the torque is measured by means of the ironless drive motor 36 itself.

The torque sensor 40 is arranged fixedly to the torque measuring device 10 with respect to the holding plate 22.

The ironless drive motor 36 is likewise fixedly arranged.

The rotational speed of the shaft 38 is measured. For this purpose, another code disk 42 is provided and an encoder 44 to read the speed information from the code disk 42.

With one rotational axis 46, the shaft 38 is arranged coaxial to the rotational axis 24 of the rotor 18. As mentioned above, compensating couplings 32a, 32b can be used to compensate a corresponding offset.

The ironless drive motor 36 makes it possible for rotational speeds that are greater than 500 revolutions per minute, in particular, to be achieved and, for example, go as high as approx. 20,000 revolutions per minute.

The rotational speed of the shaft 38 is controlled by a corresponding current being applied to the ironless drive motor 36. Provision is made for the motor current of the drive motor 36 to be measured.

The ironless drive motor 36 can be air journalled to ensure that the rotor 18 is driven with as little vibration as possible.

To obtain lower rotational speeds of less than 500 revolutions per minute, in particular, in accordance with the invention the drive apparatus 26 includes another drive, particularly a belt drive 48. For this purpose, a belt pulley 50 is seated on the shaft 38 of the ironless drive motor 36. This belt pulley 50 is connected fixedly to the shaft 38.

The belt drive 48, moreover, includes a drive motor 52 having a shaft 54 that drives another belt pulley 56. The shaft 38 can be driven by the drive motor 52 using a belt 58.

Since the drive motor 36 is ironless, the shaft 38 can be externally driven even when the drive motor 36 is in a currentless state, namely by means of the belt drive 48.

When the shaft 38 is driven using the ironless drive motor 36 and the rotational speed of the shaft 38 is set particularly above 500 revolutions per minute, the belt pulley 50 is de-coupled from the shaft 38. A corresponding de-coupling apparatus is provided for this purpose.

The drive apparatus 26 according to the invention, having an ironless drive motor 36 and a belt drive 48, allows rotational speeds of between one revolution per minute and 20,000 revolutions per minute to be set so that in turn the torque and the drag torque of the test electric motor 14 can be measured over this speed range.

Measurement is made as follows:

After the test electric motor 14 has been clamped into the torque measuring device 10, the electric motor 14 is operated at a specific rotational speed. Provision can be particularly made for the motor current of the electric motor 14 to be measured as well as a total current, comprising the motor current and a current flowing through the motor control circuit 60. Moreover, the voltage which is applied to the motor control circuit 60 is measured.

Furthermore, the phase voltages at the electric motor 14 can also be determined.

Other quantities dependent on the angular position can also be measured, such as the motor constant, the stray flux outside the electric motor 14 or the inductance of the windings of the rotor 18.

The shaft 38 of the drive apparatus 26 is driven at a rotational speed running in the same direction as the rotational direction of the test electric motor 14. The construction of the drive apparatus 26 according to the invention makes a wide speed range of between one revolution per minute and 20,000 revolutions per minute possible.

The rotational speed of the rotor 18 can be determined using the encoder 35. The resulting torque, which is thus a function of the rotational speed of the rotor 18, is then read from the torque sensor 40.

Depending on the relevant rotational speed, the shaft 38 is either driven by the belt drive 48 or by means of the ironless drive motor 36.

Provision can basically be made for a zero load curve, i.e. characteristic, of the ironless drive motor 36 to be recorded and stored. This makes it possible to then measure the torque using the ironless drive motor 36. For such measurement, the torque sensor 40 is swiveled aside.

Torque results as a product of the motor current of the ironless drive motor 36 and its motor constant. The motor constant is taken from the characteristic.

With the construction describe above, it is also possible, for example, to measure the induced voltage emitted by the test electric motor 14 at a specific rotational speed when it is driven externally. Here, the electric motor 14 itself is not operated, i.e. it remains without current. The rotor 18 is rotated by means of the drive apparatus 26 and the related voltage measurement is made.

It is basically possible for torque measurements to be made when the rotor 18 is only driven externally by the drive apparatus 26.

| IDENTIFICATION REFERENCE LIST | |
|---|---|
| 10 | Torque measuring device |
| 12 | Holding apparatus |
| 14 | Test electric motor |
| 16 | Stator |
| 18 | Rotor |
| 20 | Rotor hub |
| 22 | Holding plate |
| 24 | Rotational axis |
| 26 | Drive apparatus |
| 28 | Fixing apparatus |
| 30 | Shaft |
| 32a | Compensating coupling |
| 32b | Compensating coupling |
| 34 | Code disk |
| 35 | Encoder |
| 36 | Ironless drive motor |
| 38 | Shaft |
| 40 | Torque sensor |
| 42 | Code disk |
| 44 | Encoder |
| 46 | Rotational axis |
| 48 | Belt drive |
| 50 | Belt pulley |
| 52 | Drive motor |
| 54 | Shaft |
| 56 | Belt pulley |
| 58 | Belt |
| 60 | Motor control circuit |

The invention claimed is:

1. A torque measuring device for electric motors having a stator and a rotor, comprising:
   a holding apparatus to hold the stator of a test electric motor;
   a drive apparatus for externally driving the rotor comprising an ironless drive motor and a belt drive; and
   a torque sensor coupled to the drive apparatus;
   wherein the rotor is driveable using alternatively the belt drive or the ironless drive motor.

2. A torque measuring device according to claim 1, wherein using the drive apparatus the rotor is driveable in the same direction as a rotational direction of the rotor with the motor in operation.

3. A torque measuring device according to claim 1, wherein by means of the drive apparatus rotational speeds of between one revolution per minute and 20,000 revolutions per minute are achievable.

4. A torque measuring device according to claim 1, wherein using the belt drive rotational speeds of up to 500 revolutions per minute are achievable.

5. A torque measuring device according to claim 1, wherein when the ironless drive motor is used, the belt drive is de-coupled.

6. A torque measuring device according to claim 1, wherein when the belt drive is being used, a shaft of the ironless drive motor is driven by the belt drive.

7. A torque measuring device according to claim 1, wherein the torque sensor is coupled to the ironless drive motor and/or formed by means of the ironless drive motor.

8. A torque measuring device according to claim 7, wherein the torque sensor is positioned between the ironless drive motor and the rotor of the test electric motor.

9. A torque measuring device according to claim 1, wherein a measurement of a rotational speed is provided at the drive apparatus.

10. A torque measuring device according to claim 1, wherein a measurement of at least one of a rotational speed or an angular position is provided at the rotor.

11. A torque measuring device according to claim 1, wherein at least one compensating coupling is provided between the drive apparatus and a fixing apparatus for the rotor.

12. A torque measuring device according to claim 1, wherein the ironless drive motor is air journalled.

13. A torque measuring device according to claim 1, wherein torque is measureable as a function of a rotational speed of the rotor.

14. A torque measuring device according to claim 1, wherein motor friction is measureable as a function of rotational speed.

15. A torque measuring device according to claim 1, wherein a holding plate for the stator is air journalled.

16. A torque measuring device according to claim 1, wherein torque is measureable by means of a motor current of the ironless drive motor.

17. A torque measuring device according to claim 1, wherein the drive apparatus is more powerful than the test electric motor.

* * * * *